No. 794,005. PATENTED JULY 4, 1905.
W. H. GOLDSMITH.
EDUCATIONAL DEVICE.
APPLICATION FILED SEPT. 15, 1904.

Fig. 1.

- *Ell* — An addition to a house
- *Cleft* — A crevice
- *Chef* — A chief cook
- *Dupe* — One easily deceived
- *Groats* — Oatmeal

Fig. 2.

- *Ta-ran'-tu-la* — A species of large spider
- *Sal-e-ra'-tus* — A salt used in bread making
- *Nec-ta're-an* — Very sweet; delicious
- *Im-bon'-i-ty* — Want of goodness
- *Cel'-lu-la-ted* — Formed like a cell

Fig. 3.

- *Strum* — To play noisily on a musical instrument
- *Lance* — A weapon in form of a spear
- *Poll* — The familiar name for a parrot
- *Rote* — Repetition
- *Twang* — To make a sharp or nasal sound

Fig. 4.

- *In-de'cen-cy* — Anything offensive to modesty
- *In-firm'-a-ry* — A hospital for sick poor
- *Ne-oc'-ra-cy* — Government by persons without experience
- *Mac-a-ro'ni* — A favorite food among Italians
- *Men-ag'-er-ie* — A collection of wild animals

Fig. 5.

*Dupe* — One easily deceived

Fig. 6.

*Rote* — Repetition

Witnesses:
Sydney E. Taft.
Franklin E. Low.

Inventor:
Warren H. Goldsmith
by his Attorney
Charles S. Gooding.

No. 794,005. Patented July 4, 1905.

UNITED STATES PATENT OFFICE.

WARREN H. GOLDSMITH, OF EVERETT, MASSACHUSETTS.

EDUCATIONAL DEVICE.

SPECIFICATION forming part of Letters Patent No. 794,005, dated July 4, 1905.

Application filed September 15, 1904. Serial No. 224,493.

*To all whom it may concern:*

Be it known that I, WARREN H. GOLDSMITH, a citizen of the United States, residing at Everett, in the county of Middlesex and State of Massachusetts, have invented new and useful Improvements in Educational Devices, of which the following is a specification.

The object of this invention is to provide a cheap, simple, and interesting device for teaching the correct spelling, division, accent, and definition of words.

The invention consists of a card with a word or words printed thereon in the manner hereinafter set forth in the following specification and particularly pointed out in the claims thereof.

Referring to the drawings, Figures 1 and 2 are front elevations of cards constructed in accordance with my invention. Figs. 3 and 4 are rear elevations of the cards illustrated in Figs. 1 and 2, respectively. Figs. 5 and 6 are front and rear elevations, respectively, of a card having a single word upon the front and upon the back thereof, with the definition of each of said words printed thereunder.

In the drawings, 10 and 11 are pieces of cardboard of sufficient thickness and rigidity so that said cardboard may be held at one end without bending of its own weight. Upon the front face 12 of the cardboard 10 is printed a series of words of one syllable, as seen in Fig. 1. These words are arranged in a vertical column, and under each word is printed the definition of said word. Upon the rear face 13 of the cardboard 10 is printed another series of words all of one syllable, and each of these words also has printed thereunder a proper definition. The words constituting the series referred to upon the faces of the cardboard 10 are arranged in heavy black type for the purpose of making a lasting impression on the mind through the eye, while the definition of said words is in each case printed in much lighter type.

In Figs. 2 and 4 a card is illustrated in which a series of words is printed in heavy type and in vertical columns upon opposite faces of said card 11, said words upon the front face 14 and upon the rear face 15 of said card 11 being words of three syllables. In each case the definition of the word is placed thereunder and the word defined is printed in heavy black type, while the definition is set forth in comparatively light type.

In carrying my improved device into practical operation words of more than one syllable are divided by hyphens into the proper syllables and an accent is also attached to the accented syllable. Upon the front faces 12 and 14 of the cards 10 and 11, respectively, are a series of heavy black lines 16, which separate the different words of the series one from the other, the object of said lines 16 being so that if desired the cards 10 and 11 may be cut along said lines, thus producing the single-word cards illustrated in Figs. 5 and 6.

In carrying my said invention into practical form, so that the same may be produced for a small sum to bring the device within the reach of a very large number of people, the cards are printed with a series of words (eleven in number) upon the opposite sides thereof, making twenty-two words to each card, and fifty-six of these cards are placed in a box, making a total of twelve hundred and thirty-two words in each box. In the same box all of the cards have words of the same number of syllables. For instance, one box would have cards having words of one syllable, and in another box words of two syllables, and in another box words of three syllables, and so on to any number of syllables which may be desired.

The cards may be used by one person or by any number of persons as a game, and in the case of said cards being used as a game a leader is chosen to give out the words, sides may be chosen, and the game continued until one side has spelled the other down, as in the old-fashioned spelling-matches. In using my improved educational device as a game sides may be chosen or the game may be played in a circle. In case that the number of persons playing is large enough sides may be chosen and the game proceeds until one side has spelled the other down. If the party is too small to form sides, the leader gives out the words in turn around the circle. When playing as a circle, a score is kept of the failures, and the person having the least number of misses is declared the winner. If two or more are tied for winner, the game continues until one has spelled the others down. When a word is given out, its definition is given with it and each person learns the meaning of the words which he and all the others are called upon to spell. This is a helpful feature of the game. To give all a fair chance regarding difficult words, the leader calls the words in their order on both sides of the strips, and in using the small cards he takes them up singly before looking at them.

When using the small cards illustrated in Figs. 5 and 6 in the circle, the scoring may be varied. He who spells both words on a card receives that card, and he who misses either receives no card. At the close the largest number of cards shows the winner. Ties for winner are dissolved as above. By having different words all of the same number of syllables upon one card or upon all of the cards included in one box of cards the game or teaching may be adapted to the age or proficiency of the persons using the same.

Having thus described my invention, what I claim, and desire by Letters Patent to secure, is—

1. An educational device consisting of a card with a series of words, each of the same number of syllables, printed thereon.

2. An educational device consisting of a card with a series of words, each of the same number of syllables, printed thereon, and the definition of each word printed thereunder.

3. An educational device consisting of a card with a series of words, each of the same number of syllables, printed upon opposite faces thereof.

4. An educational device consisting of a card with a series of words, each of the same number of syllables, printed upon opposite faces thereof, and a line between each of the words upon one face of said card.

5. An educational device consisting of a card with a series of words, each of the same number of syllables, printed upon opposite faces thereof, and the definition of each word printed thereunder.

6. An educational device consisting of a card with a series of words, each of the same number of syllables, printed thereon, said words each divided into syllables and correctly accented.

7. An educational device consisting of a card with a word printed thereon in heavy type and the definition of said word printed thereunder in light type.

8. An educational device consisting of a card with a word printed upon each of the opposite faces thereof in heavy type and the definition of each of said words printed thereunder in light type, said words each having the same number of syllables.

In testimony whereof I have hereunto set my hand in presence of two subscribing witnesses.

WARREN H. GOLDSMITH.

Witnesses:
CHARLES S. GOODING,
ANNIE J. DAILEY.